(12) United States Patent
Nagarajan et al.

(10) Patent No.: US 7,827,753 B2
(45) Date of Patent: Nov. 9, 2010

(54) LOFTED MAT FOR SHINGLES

(75) Inventors: Venkata S. Nagarajan, New Albany, OH (US); Anthony L. Rockwell, Pickerington, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 760 days.

(21) Appl. No.: 11/648,075

(22) Filed: Dec. 30, 2006

(65) Prior Publication Data

US 2007/0137131 A1   Jun. 21, 2007

Related U.S. Application Data

(63) Continuation-in-part of application No. 11/050,098, filed on Feb. 3, 2005, now Pat. No. 7,357,974, and a continuation-in-part of application No. 10/609,947, filed on Jun. 30, 2003, now Pat. No. 7,128,561.

(51) Int. Cl.
*E04D 1/00* (2006.01)

(52) U.S. Cl. .............................. 52/560; 52/557; 52/559; 52/553; 52/554; 52/555

(58) Field of Classification Search .................. 52/560, 52/557, 559, 553–555
See application file for complete search history.

(56) References Cited

U.S. PATENT DOCUMENTS

| | | | | | |
|---|---|---|---|---|---|
| 1,207,523 | A * | 12/1916 | Ford | ............................. | 52/557 |
| 1,310,082 | A * | 7/1919 | Hose | ............................ | 52/518 |
| 1,534,165 | A * | 4/1925 | Cumfer | ....................... | 52/546 |
| 2,241,603 | A * | 5/1941 | Kirschbraun | ................ | 52/560 |
| 2,323,230 | A * | 6/1943 | McAvoy | ..................... | 52/559 |
| 3,613,328 | A * | 10/1971 | Morgan et al. | ................. | 52/555 |
| 3,624,975 | A * | 12/1971 | Morgan et al. | ................. | 52/105 |
| 3,830,687 | A * | 8/1974 | Re et al. | ........................ | 428/70 |
| 3,921,358 | A * | 11/1975 | Bettoli | ......................... | 52/314 |
| 4,233,100 | A * | 11/1980 | Cunningham et al. | ........ | 156/260 |
| 4,274,243 | A * | 6/1981 | Corbin et al. | ............... | 52/748.1 |
| 4,405,680 | A | 9/1983 | Hansen | | |
| 4,499,701 | A * | 2/1985 | Bockwinkel et al. | ........... | 52/555 |
| 4,571,356 | A | 2/1986 | White, Sr. et al. | | |
| 4,634,622 | A * | 1/1987 | Jenkins et al. | ............... | 428/143 |
| 4,717,614 | A * | 1/1988 | Bondoc et al. | .............. | 428/143 |
| 4,869,942 | A * | 9/1989 | Jennus et al. | .................. | 428/77 |
| 5,232,530 | A * | 8/1993 | Malmquist et al. | ............ | 156/78 |
| 5,369,929 | A * | 12/1994 | Weaver et al. | .................. | 52/557 |
| D366,124 | S * | 1/1996 | Hannah et al. | .............. | D25/139 |
| D369,421 | S * | 4/1996 | Kiik et al. | ................... | D25/139 |
| 5,571,596 | A * | 11/1996 | Johnson | ....................... | 428/143 |
| 5,595,036 | A * | 1/1997 | Nakamura | .................... | 52/554 |
| 5,611,186 | A * | 3/1997 | Weaver | ......................... | 52/557 |
| 5,666,776 | A * | 9/1997 | Weaver et al. | .................. | 52/557 |
| 5,865,003 | A | 2/1999 | Klett et al. | | |
| 5,953,877 | A * | 9/1999 | Kalkanoglu et al. | ........... | 52/554 |

(Continued)

*Primary Examiner*—Richard E Chilcot, Jr.
*Assistant Examiner*—Mark R Wendell
(74) *Attorney, Agent, or Firm*—MacMillan, Sobanski & Todd, LLC

(57) ABSTRACT

A roofing shingle comprising a mat having regions of various thicknesses. A layer of asphalt-based material coats the mat and a layer of granules is deposited on the asphalt-coated mat. The variations in the thickness of the regions of the mat give the shingle differences in thickness corresponding to the thickness variations in the regions of the mat, thereby giving the shingle an appearance of depth.

32 Claims, 5 Drawing Sheets

U.S. PATENT DOCUMENTS

| | | |
|---|---|---|
| 5,980,680 A | 11/1999 | Miller |
| 6,010,589 A * | 1/2000 | Stahl et al. .................. 156/260 |
| 6,014,847 A * | 1/2000 | Phillips .................... 52/311.1 |
| 6,038,827 A * | 3/2000 | Sieling ........................ 52/557 |
| 6,105,329 A * | 8/2000 | Bondoc et al. ................ 52/557 |
| 6,220,329 B1 * | 4/2001 | King et al. .................. 156/512 |
| 6,289,648 B1 * | 9/2001 | Freshwater et al. ........... 52/557 |
| 6,291,552 B1 | 9/2001 | Dong |
| 6,457,290 B1 * | 10/2002 | Elliott ........................ 52/557 |
| 6,510,664 B2 * | 1/2003 | Kupczyk ..................... 52/528 |
| 6,544,374 B2 * | 4/2003 | King et al. .................. 156/260 |
| 6,578,336 B2 * | 6/2003 | Elliott ........................ 52/555 |
| 6,692,608 B2 * | 2/2004 | Phillips ..................... 156/260 |
| 6,708,456 B2 * | 3/2004 | Kiik et al. ...................... 52/98 |
| 6,933,037 B2 * | 8/2005 | McCumber et al. ......... 428/143 |
| 6,936,329 B2 * | 8/2005 | Kiik et al. .................... 428/141 |
| 6,972,149 B2 * | 12/2005 | Kuipers et al. .............. 428/156 |
| 6,990,779 B2 * | 1/2006 | Kiik et al. ..................... 52/554 |
| 6,993,876 B1 | 2/2006 | Peng et al. |
| 2002/0001673 A1 * | 1/2002 | Phillips ..................... 427/180 |
| 2002/0160151 A1 | 10/2002 | Pinault et al. |
| 2003/0163964 A1 * | 9/2003 | Elliott ........................ 52/314 |
| 2004/0055241 A1 * | 3/2004 | Railkar ...................... 52/555 |
| 2004/0079042 A1 * | 4/2004 | Elliott ........................ 52/557 |
| 2004/0107664 A1 * | 6/2004 | Rodrigues ................... 52/557 |
| 2005/0191922 A1 | 9/2005 | Xing et al. |
| 2006/0059834 A1 * | 3/2006 | Elliott et al. .................. 52/557 |

* cited by examiner

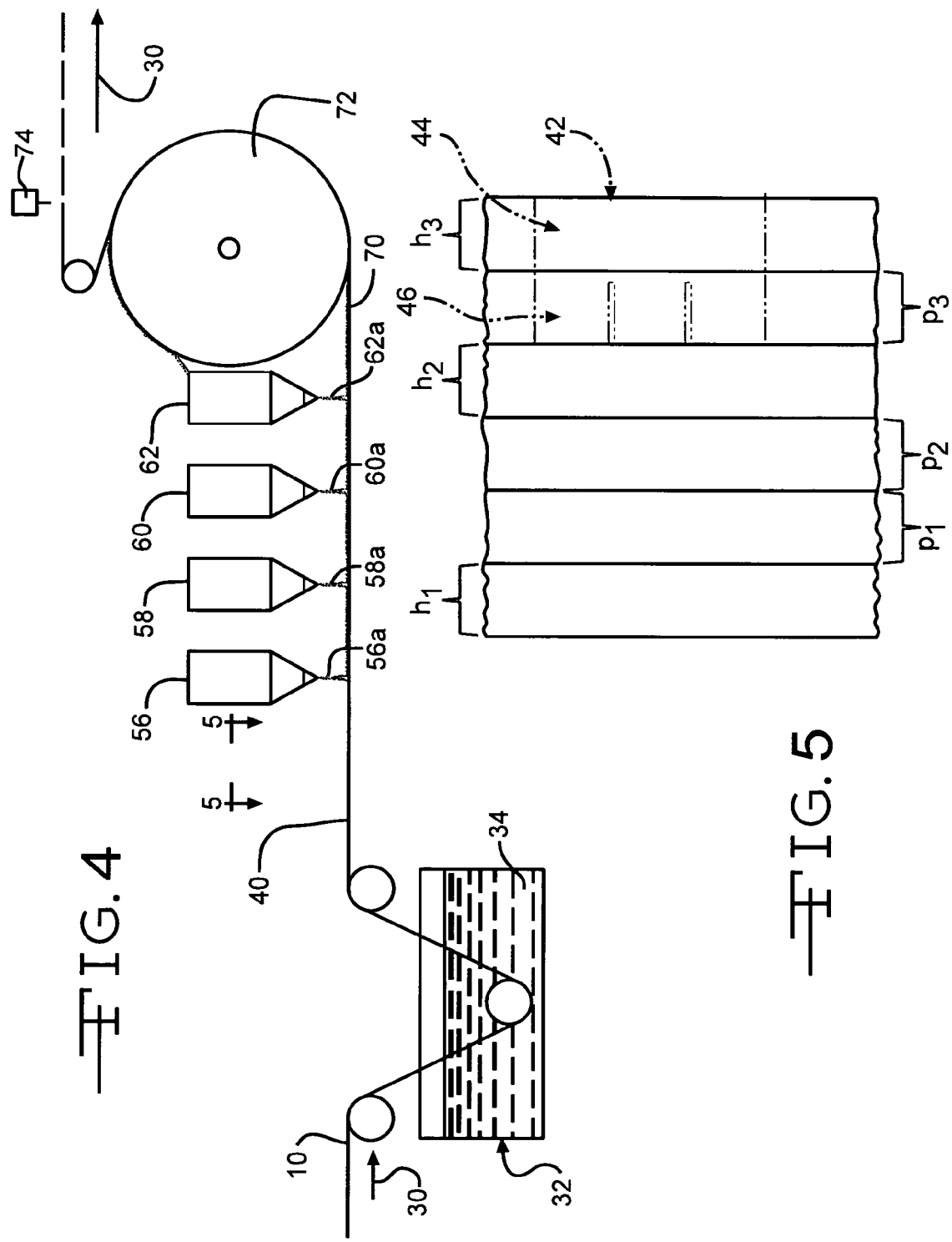

LOFTED MAT FOR SHINGLES

RELATED APPLICATIONS

This application is a continuation-in-part of U.S. patent application Ser. No. 11/050,098, filed Feb. 3, 2005 now U.S. Pat. No. 7,357,974 which is a continuation-in-part of U.S. patent application Ser. No. 10/609,947 filed Jun. 30, 2003 (now U.S. Pat. No. 7,128,561, issued Oct. 31, 2006), the disclosures of which are incorporated in the present application in their entirety.

TECHNICAL FIELD

This invention relates to roofing shingles. More particularly, this invention relates to roofing shingles manufactured to have the appearance of depth.

BACKGROUND OF THE INVENTION

In the past, roofing shingles have had to satisfy two main functions when applied to a roof deck. The first function is to provide a durable, weatherproof covering for the roof deck. Roof shingles, whatever their form, are intended to provide a means of sheltering the structure below the shingles from precipitation and the deleterious effects of sun and wind. Roof shingles installed on the roof deck must perform these protecting functions for a reasonable period of time.

The second function is to present an aesthetically pleasing architectural feature which enhances the overall appeal of the structure to which the shingles have been applied. This aesthetic function has been satisfied by providing asphalt shingles with various butt edge contours and surface treatments which operate to simulate more traditional, and in most cases more expensive, forms of roof coverings, such as thatch, wooden shakes, slates, and even tiles of various forms.

In order to satisfy the aesthetic function, shingles have been manufactured using a laminated design to increase the appearance of depth in the shingle. A laminated shingle design typically includes an overlay member laminated to an underlay member. The overlay member may have tabs of varying lengths and may be finished with granules of varying colors. Similarly, the underlay may have tabs generally corresponding to the overlay tabs. Portions of the underlay may have granules of varying color for the additional appearance of depth.

It would be advantageous to produce a shingle having the appearance of depth, more efficiently.

SUMMARY OF THE INVENTION

The above objects as well as other objects not specifically enumerated are achieved by a roofing shingle comprising a mat having regions of various thicknesses. A layer of asphalt-based material coats the mat and a layer of granules is deposited on the asphalt-coated mat. The variations in the thickness of the regions of the mat give the shingle differences in thickness corresponding to the thickness variations in the regions of the mat, thereby giving the shingle an appearance of depth.

According to this invention there is also provided a method of manufacturing roofing shingles comprising the steps of: providing a mat, selectively modifying regions of the mat to make those regions more dense, thereby producing a densified mat, the densified mat having regions of various thicknesses, with the more dense regions being of lesser thickness than other regions, coating the densified mat with roofing asphalt to make an asphalt-coated sheet, depositing granules onto the asphalt-coated sheet to form a granule-covered sheet, and cutting the granule-covered sheet into shingles. The variations in the thickness of the regions of the mat give the shingle differences in thickness corresponding to the thickness variations in the regions of the mat, thereby giving the shingle an appearance of depth.

According to this invention there is also provided a method of manufacturing roofing shingles comprising the steps of: providing a mat, providing a base layer, applying the mat to the top of the base layer to form a multi-layered mat, the base layer being wider in the cross-machine direction than the mat so that the multi-layered mat has regions of various thickness, coating the multi-layered mat with roofing asphalt to make an asphalt-coated sheet, depositing granules onto the asphalt-coated sheet to form a granule-covered sheet, and cutting the granule-covered sheet into shingles. The variations in the thickness of the regions of the multi-layered mat give the shingle differences in thickness corresponding to the thickness variations in the regions of the multi-layered mat, thereby giving the shingle an appearance of depth.

Various objects and advantages of this invention will become apparent to those skilled in the art from the following detailed description of the invention, when read in light of the accompanying drawings.

BRIEF DESCRIPTION OF THE DRAWINGS

FIG. 4 is a side view, in elevation, of an apparatus for manufacturing a roofing shingle using the densified mat of FIG. 1.

FIG. 5 is a plan view, in elevation, of an asphalt-coated sheet of FIG. 4, taken along the line 5-5.

DETAILED DESCRIPTION OF THE INVENTION

The description and drawings disclose a roofing shingle manufactured from a densified mat and a method for manufacturing the roofing shingle. The densified mat has regions of varying thickness used to provide depth. The densified mat is configured to provide strength and fire resistance to the roofing shingle.

Figure 1:
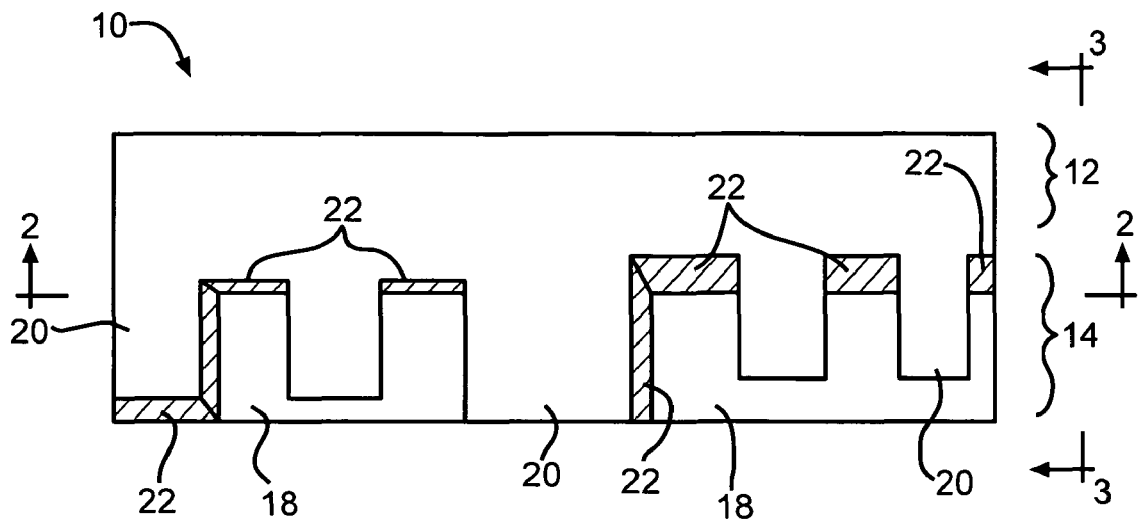
FIG. 1 is a plan view, in elevation, of a densified mat used to make shingles according to the invention.
Figure 2:
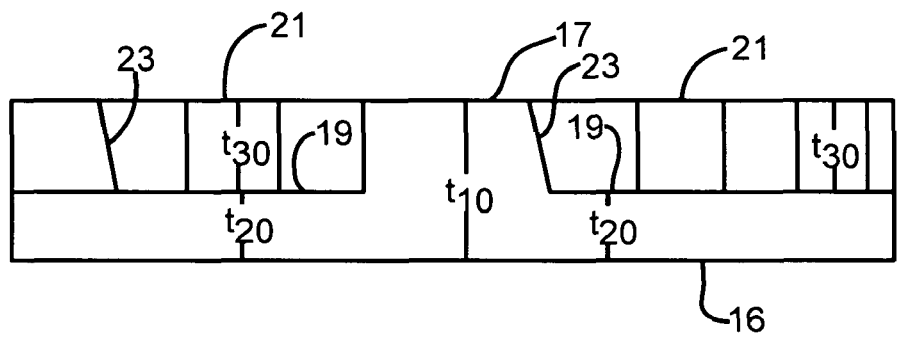
FIG. 2 is a front view, in elevation, of the densified mat of FIG. 1, taken along the line 2-2.
Figure 3:
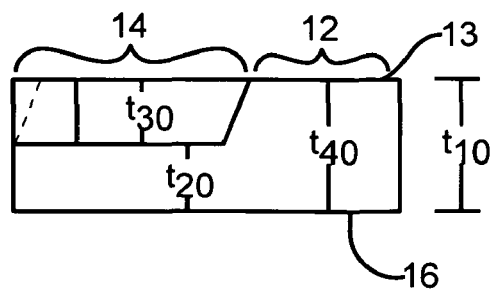
FIG. 3 is a side view, in elevation, of the densified mat of FIG. 1, taken along the line 3-3.

Referring now to the drawings, there is shown in FIGS. 1-3 a unitary densified mat for manufacturing the roofing shingle according to the invention. The term "unitary", as used herein, is defined to mean formed from a single continuous body and further defined to mean not formed by assembling multiple discrete mat portions together. The densified mat 10 includes a headlap region 12 and a prime region 14. The headlap region 12 may be ultimately covered by adjacent shingles when installed upon a roof The prime region 14 will be ultimately visible when the shingles are installed upon a roof.

As best shown in FIG. 2, the densified mat 10 includes a back surface 16 configured to be positioned against a building structure, such as for example a roof deck. In this embodiment, the back surface 16 is substantially a flat surface. In another embodiment, the back surface 16 may have a rippled surface or any other surface sufficient to be positioned against the building structure. The densified mat 10 also includes a top surface 17. The densified mat 10 has a thickness t10 measured from the back surface 16 to the top surface 17.

Referring again to FIG. 1, the prime region 14 of the densified mat 10 includes a plurality of regions which may have various thicknesses, including a plurality of tab regions 20, a plurality of cutout regions 18, and a plurality of transition or angled regions 22. The tab regions 20, cutout regions 18, and transition or angled regions 22 have top surfaces 19, 21 and 23 respectively. In this embodiment, the densified mat 10 is shown with a plurality of tab regions 20, cutout regions 18, and transition or angled regions 22. It is to be understood that in another embodiment, any number of tab regions 20, cutout regions 18, and transition or angled regions 22 can be used, or the lofted mat may resemble a flat strip shingle (such as a 3-tab or no-cutout shingle).

In this embodiment, the cutout regions 18 have a thickness t20. The thickness t20 is measured from the back surface 16 to the top surface 19 of the cutout region 18, and while illustrated as having the same thickness in the figures, in an alternate embodiment, the thickness t20 may differ for one or more cutout regions 18, versus another cutout region 18, to provide more depth to some or all of the tabs.

Similarly, in this embodiment, the tab regions 20 have a thickness t30. The thickness t30 is measured from the back surface 16 to the top surface 21 of the tab region 20.

In this embodiment as further shown in FIG. 1 and 2, the densified mat 10 is shown with a plurality of transition or angled regions 22. In this embodiment, the transition or angled regions 22 extend from the top surface 19 of the cutout region 18 to the top surface 21 of the tab region 20. In another embodiment, the transition or angled regions 22 could extend from the back surface 16 to the top surface 19 of the cutout region 18 or from the back surface 16 to the top surface 21 of the tab region 20. As shown in FIGS. 1 and 2, the angled regions 22 may have any angle or configuration sufficient to connect the top surface 19 of the cutout region 18 with the top surface 21 of the tab region 20. In another embodiment, one or more of the transitions may be angled, straight, or a mixture thereof.

In this embodiment, the thickness t10 is in a range from about 0.025 inches to about 1.500 inches. In another embodiment, the thickness t10 can be less than 0.025 inches or more than 1.500 inches. In this embodiment, the thickness t20 and the thickness t30, each are in a range from about 0.012 inches to about 0.750 inches. In another embodiment, the thickness t20 and the thickness t30, each of can be less than 0.012 inches or more than 0.750 inches. One skilled in the art appreciates that one or more of the thicknesses may be varied to provide a desired aesthetics, density and weathering or other properties.

As shown in FIG. 3, the headlap region 12 has a top surface 13. The headlap region 12 also has a thickness t40. The thickness t40 is measured from the back surface 16 to the top surface 13 of the headlap region 12. In this embodiment, the thickness t40 is a substantially uniform thickness. In another embodiment, the thickness t46 can vary. In this embodiment, the thickness t40 is in a range from about 0.025 inches to about 1.500 inches. In another embodiment, the thickness t40 can be less than 0.025 inches or more than 1.500 inches.

In one embodiment, the ratio of the thickness t30 of the tab region 20 of the densified mat 10 to the thickness t20 of the cutout region 18 of the densified mat 10 is in a range from about 1.0 to about 3.0. Similarly, the ratio of the thickness of the tab regions 20 of the shingle to the thickness of the cutout regions 18 of the shingle are in a range from about 1.5 to about 8.0. In another embodiment, the ratio of the thickness t30 of the tab region 20 of the densified mat 10 to the thickness t20 of the cutout region 18 of the densified mat 10 could be more than 1.0 or less than 3.0 and the ratio of the thickness of the tab regions 20 of the shingle to the thickness of the cutout regions 18 of the shingle can be less than 1.5 or more than 8.0.

The variations in the thickness of the tab regions 20 of the densified mat 10 and the cutout regions 18 of the densified mat 10 give the roofing shingle differences in thickness. The differences in thickness of the roofing shingle substantially correspond to the thickness variations in the tab 20 and cutout 18 regions of the densified mat 10, thereby giving the shingle an appearance of depth. Substantially corresponds is defined to means the variations in thickness of the regions of the shingle align with the variations in thickness of the regions of the densified mat.

In this embodiment, the densified mat 10 is formed from a fibrous material. In the illustrated embodiment, the fibrous material is a polymer based thermoplastic material. The polymer based thermoplastic material can include polyester, polyethylene, polypropylene, polyethylene terephthalate, rayon, nylon and a mixture of these materials. In another embodiment, the densified mat 10 made be formed from a foam-based material, such as for example a polymer-based foam, or any other foam sufficient to provide strength and fire resistance to the asphalt shingle. In yet another embodiment, the densified mat 10 can be filled with a filler material. The filler material is configured to intersperse in the densified mat 10 and replace the air gaps in the densified mat 10. In this embodiment the filler material can be any material, such as for example foam or gypsum, or any other material sufficient to intersperse in the densified mat 10 and replace the air gaps in the densified mat 10.

In this embodiment, the polymer based thermoplastic material may also include fibers configured to provide strength to the densified mat 10. The fibers can be glass fibers, natural fibers, a mixture of glass and natural fibers, or any other fiber sufficient to provide strength to the densified mat 10.

In this embodiment, the polymer based thermoplastic material has a pre-densifying thickness in a range from about 0.050 inches to about 3.000 inches. In another embodiment, the pre-densifying thickness of the polymer based thermoplastic material can be more than 3.000 inches or less than 0.050 inches. One skilled in the art appreciates that one or more of the thicknesses may be varied to provide a desired thickness, density or other properties.

In one embodiment, the densified mat 10 can be manufactured by a selective modification process that includes an apparatus for forming a densified surface layer on a thermoplastic blanket. The apparatus includes continuous upper and lower belts that define a treatment zone. Within the treatment zone, regions of the thermoplastic blanket are subjected to heat and compression. Downstream from the heat and compression, the thermoplastic blanket is cooled. One type of apparatus for forming a densified mat 10 is an apparatus of the type disclosed in U.S. Pat. No. 7,128,561 to Rockwell et al., which is hereby incorporated by reference in its entirety. In other embodiments, the densified mat 10 can be manufactured by other processes, including the use of a press or compression rolls with and without the application of heat, or with other known processes.

In this embodiment, the polymer based thermoplastic material has a starting density of D. As a result of the selective modification process, the tab regions 20 of the densified mat 10 may be maintained at an increase in density of no more than about 0- to about 40% from the density of the mat prior to the modification process. The resulting density of the cut-out regions 18 of the mat may range from about 1 to about 15 times that of the original density of the mat prior to the modification process. In another embodiment, the densified mat 10 may have tab regions 20 with an increase in density of more than 40% and cutout regions 18 with densities more than 15 times the original density D. In yet another embodiment, the densified mat 10 can be manufactured in a manner resulting in highly compressed tab regions 20 and highly compressed cutout regions 18. In this embodiment, the resulting densities of the tab regions 20 and the cutout regions 18 may be as high as 30 to 35 times the original density D.

In one embodiment, an optional facing layer (not shown) may be added to the top surfaces of the headlap 12 and prime 14 portions of the densified mat 10. The optional facing layer may be configured to provide a sufficient bonding surface for an asphalt coating, as will be discussed later. The optional facing layer can include polyester or rayon, or any other material sufficient to provide a bonding surface for an asphalt coating. However, the facing layer is optional and not required for the invention. A facing layer may also be used to reduce porosity or improve strength, tear of provide other properties. While not intending to be limiting, examples include glass mats or veils, or polymer films, etc.

In one embodiment, the densified mat 10 can be rolled onto a roll and stored (not shown) for future shingle manufacturing. In another embodiment, the densified mat 10 can continue directly from the mat densifying operation to the shingle manufacturing operation.

As shown in FIG. 4, the shingle manufacturing operation involves passing the densified mat 10 in a machine direction (indicated by an arrow 30) through a series of manufacturing operations. The densified mat 10 can be moved at any suitable speed.

The densified mat 10 is fed through a coater 32 where asphalt 34 is applied to the densified mat 10. In one embodiment, the densified mat 10 is fed through a dip tank. The dip tank contains hot, melted asphalt. In another embodiment, the asphalt 34 may be applied in other manners, including roll coaters or sprayers, or any other manner sufficient to apply asphalt 34 to the densified shingle mat 10. In one embodiment, the applied asphalt 34 saturates the densified mat 10. In another embodiment, the asphalt 34 is applied to form a layer of asphalt. The layer of asphalt encapsulates the densified mat 10. Typically the asphalt material is highly filled with a ground stone filler material, amounting to at least about 60 percent by weight of the asphalt/filler combination. The densified mat 10 exits the coater 32 as an asphalt-coated sheet 40. The asphalt coating 34 on the asphalt-coated sheet 40 remains hot. In one embodiment, the mat is saturated with a low performance asphalt or other material, and the exposed portion is then covered with a weathering material, such as a known shingle coating asphalt.

The asphalt-coated sheet 40 may comprise a plurality of distinct lanes as shown in FIG. 5. In the illustrated embodiment, the asphalt-coated sheet 40 comprises six distinct regions or lanes including three headlap lanes h1, h2, and h3, and three prime lanes p1, p2, and p3. An exemplary roofing shingle is shown by a phantom line 42 and may be cut from asphalt-coated sheet 40 as shown. In this manner, three roofing shingles of any length desired may be cut from each such length of asphalt-coated sheet 40. Each shingle 42 would contain one headlap lane h1, h2, or h3, and one respective adjacent prime lane p1, p2, or p3. Accordingly, the shingle 42 includes a headlap region 44 and a prime region 26. Alternatively, the asphalt-coated sheet 40 may comprise any number of distinct lanes, including more than six or less than six, sufficient for each shingle 42 to include a headlap region 44 and a prime region 46.

In this embodiment, the shingle 42 is cut from the asphalt-coated sheet 40 to be three feet long by one foot wide. It is to be appreciated that the asphalt-coated sheet 40 may have a wide variety of widths to allow different numbers of shingles to be cut therefrom. In an alternate embodiment, the shingles travel 90 degrees from that shown in the figures, in one such example, the shingles are made from a 3 foot wide sheet which is cut to 1 foot lengths to form a 1 ft. high by 3 ft. wide shingle.

Referring again to FIG. 4 in one embodiment, the asphalt-coated sheet 40 is then passed beneath a series of granule hoppers or blenders 56, 58, 60 and 62 for dispensing granules 56a, 58a, 60a and 62a to an upper surface of the asphalt-coated sheet 40. The granule blenders 56, 58, 60 and 62 can be of any type suitable for depositing granules onto the asphalt-coated sheet 40. An example of a granule blender is a granule blender of the type disclosed in U.S. Pat. No. 5,599,581 to Burton et al., which is hereby incorporated by reference, in its entirety. Additionally, a granule valve such as the granule valve disclosed in U.S. Pat. No. 6,610,147 to Aschenbeck may also be used. U.S. Pat. No. 6,610,147 to Aschenbeck is also incorporated by reference in its entirety. Although four granule blenders 56, 58, 60 and 62 are shown in the embodiment illustrated in FIG. 4, any suitable number and configuration of granule blenders can be used. Granule blender 62 is typically a backfill hopper, and is configured to discharge background granules.

Generally, the granules 56a, 58a, 60a and 62a deposited on the upper surface of the asphalt-coated sheet 40 shield the asphalt material from direct sunlight, offer resistance to fire, and provide texture to the shingle. The granules generally involve at least two different types of granules. "Headlap" granules, which are relatively low in cost and primarily serve the functional purpose of protecting the underlying asphalt material, are applied to the headlap regions h1, h2 and h3. Colored granules or other "prime" granules are relatively expensive and are applied to the shingle 42 at the prime regions p1, p2 and p3. Prime granules are disposed upon the asphalt strip for both the functional purpose of protecting the underlying asphalt strip and for the purpose of providing an aesthetically pleasing roof.

In another embodiment, prime granules are disposed on the prime regions p1, p2 and p3 and a film (not shown) is applied to the headlap regions h1, h2 and h3. The applied film is configured to strengthen the headlap lanes h1, h2 and h3. The application of the film to the headlap lanes h1, h2 and h3 results in a more lightweight shingle by eliminating the headlap granules. In one embodiment, the film can be made of a PVC film. Alternatively, the film can be another material, such as polypropylene, polyester, fabric, foil, or any other material sufficient to strengthen the headlap lanes h1, h2, and h3. In a further alternative embodiment, a weatherable film is provided in the prime region. The film may be printed prior to application to provide the final aesthetics of the shingle, and in such an instance no granules would be applied to the shingle.

Applying granules 56a, 58a, 60a and 62a to the asphalt-coated sheet 40 produces a granule-covered sheet 70. As further shown in FIG. 4, the granule-covered sheet 70 is turned around a slate drum 72 to press the granules into the asphalt coating and to temporarily invert the granule-covered sheet 70 so that the excess granules fall off. The excess granules are recovered and reused. The granule-covered 70 is subsequently fed through a cutter 74 that cuts the granule-covered sheet 70 into individual shingles 42. The cutter 74 can be any type of cutter, such as for example a rotary cutter, sufficient to cut the granule-covered sheet 70 into individual shingles 42. In yet a further embodiment, no asphalt is used, and in its place a polymer coating is applied to the sheet and optionally granules may be applied to adhere to the polymer coating.

Figure 6:
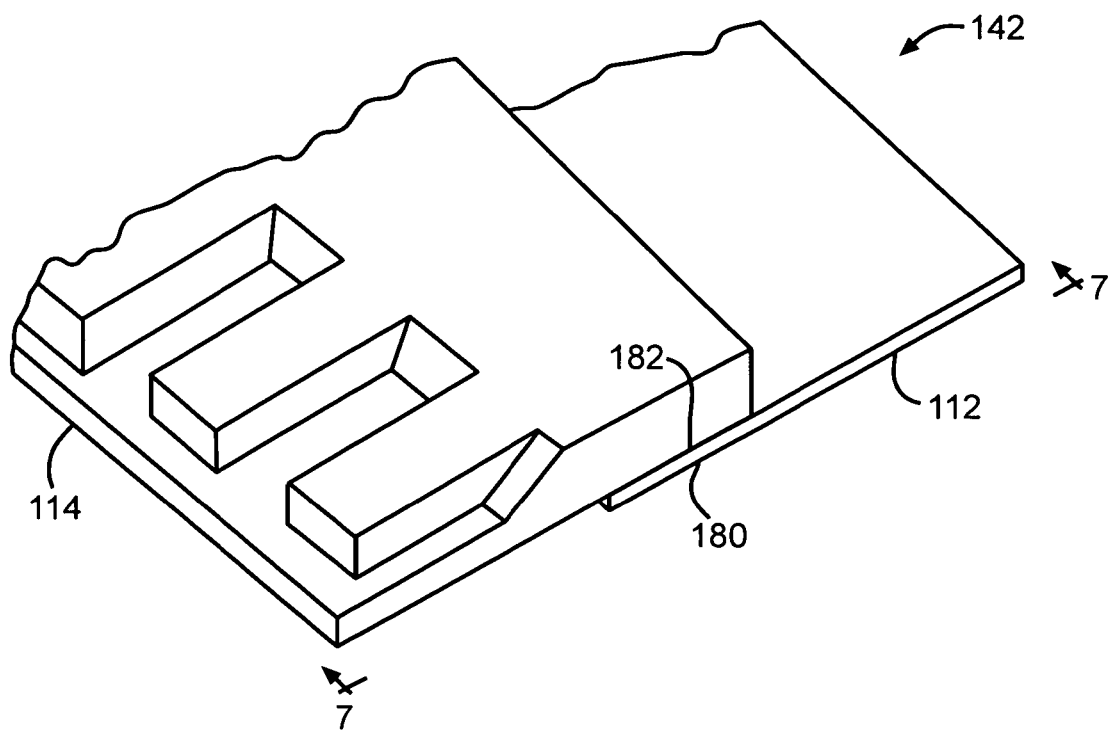
FIG. 6 is a schematic view of a second embodiment of a roofing shingle.
Figure 7:
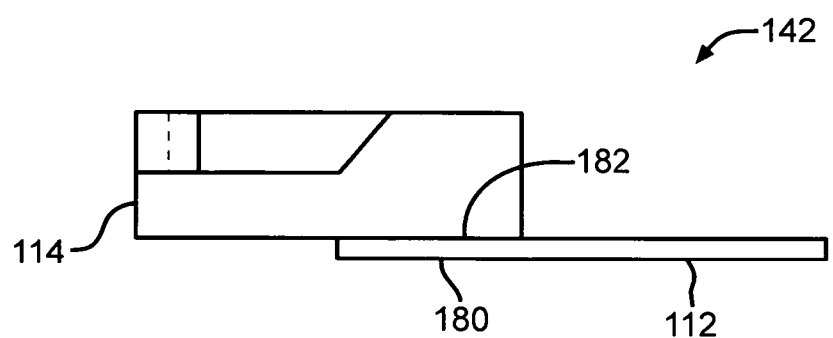
FIG. 7 is a side view, in elevation, of the roofing shingle of FIG. 6, taken along the line 7-7.

In another embodiment as shown in FIGS. 6 and 7, the shingle 142 comprises separate components for the prime region 114 and the headlap region 112. The separate prime component 114 and the headlap component 112 are bonded together using any suitable bonding manner. In the illustrated embodiment, a first portion 180 of the headlap component 112 is positioned underneath a rear portion 182 of the prime component 114. In another embodiment, the first portion 180 of the headlap component 112 could be positioned adjacent to the rear portion 182 of the prime component 114 such as to form a butt joint.

In this embodiment, the prime component 114 comprises a densified mat, optionally covered with granules. The densified mat is manufactured as previously described. The headlap component 112 can be any asphalt and granule covered roofing component, many examples of which are well known in the art. Alternatively, the headlap component 112 can be any material or structure, such as a polymer sheet, sufficient to bond to the prime component 114 and be attached to the building structure.

Figure 8:
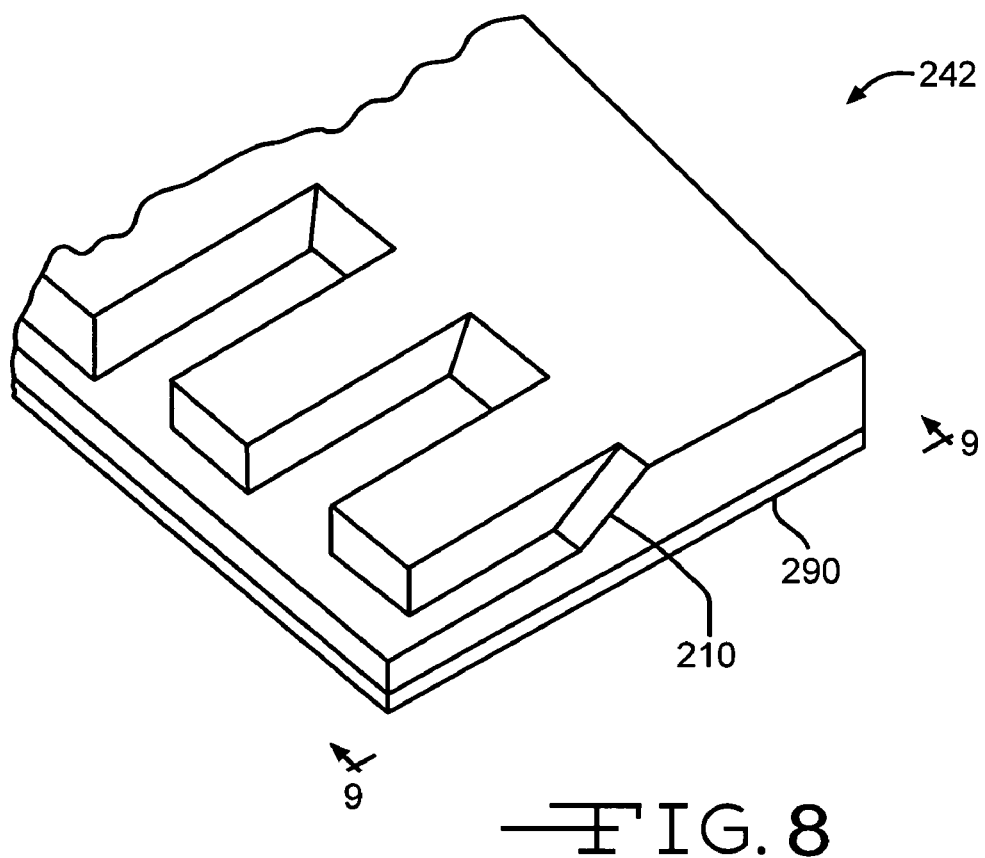
FIG. 8 is a schematic view of a third embodiment of a roofing shingle.
Figure 9:
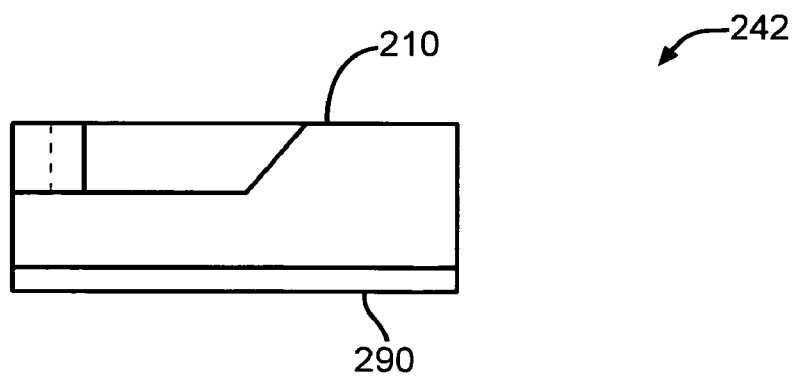
FIG. 9 is a side view, in elevation, of the roofing shingle of FIG. 8, taken along the line 9-9.

In another embodiment as shown in FIGS. 8 and 9, the shingle 242 comprises multiple layers. In this embodiment, the multiple layers include the base layer 290 and the densified mat 210. Alternatively, the shingle 242 can include additional layers, such as for example an additional strengthening layer.

A preferred base layer 290 is a layer of fibrous material configured to provide support for the densified mat 210. In the illustrated embodiment, the fibrous material is a polymer based thermoplastic material. The polymer based thermoplastic material can include polyester, polyethylene, polypropylene, polyethylene terephthalate, rayon, nylon and a mixture of these materials. The polymer based thermoplastic material may also include fibers configured to provide strength to the base layer 290. The fibers can be glass fibers, natural fibers, a mixture of glass and natural fibers, or any other fiber sufficient to provide strength to the base layer 290. Alternatively, the base layer 290 can be made of any material, such as felt or polymer or metal film, sufficient to provide support to the densified mat 210. In an alternative embodiment (not shown), the densified mat 210 is cut out within the cutout regions 18 and the base layer 290 provides waterproofing and aesthetics.

The densified mat 210 has regions of various thickness and is manufactured as described above.

Figure 10:
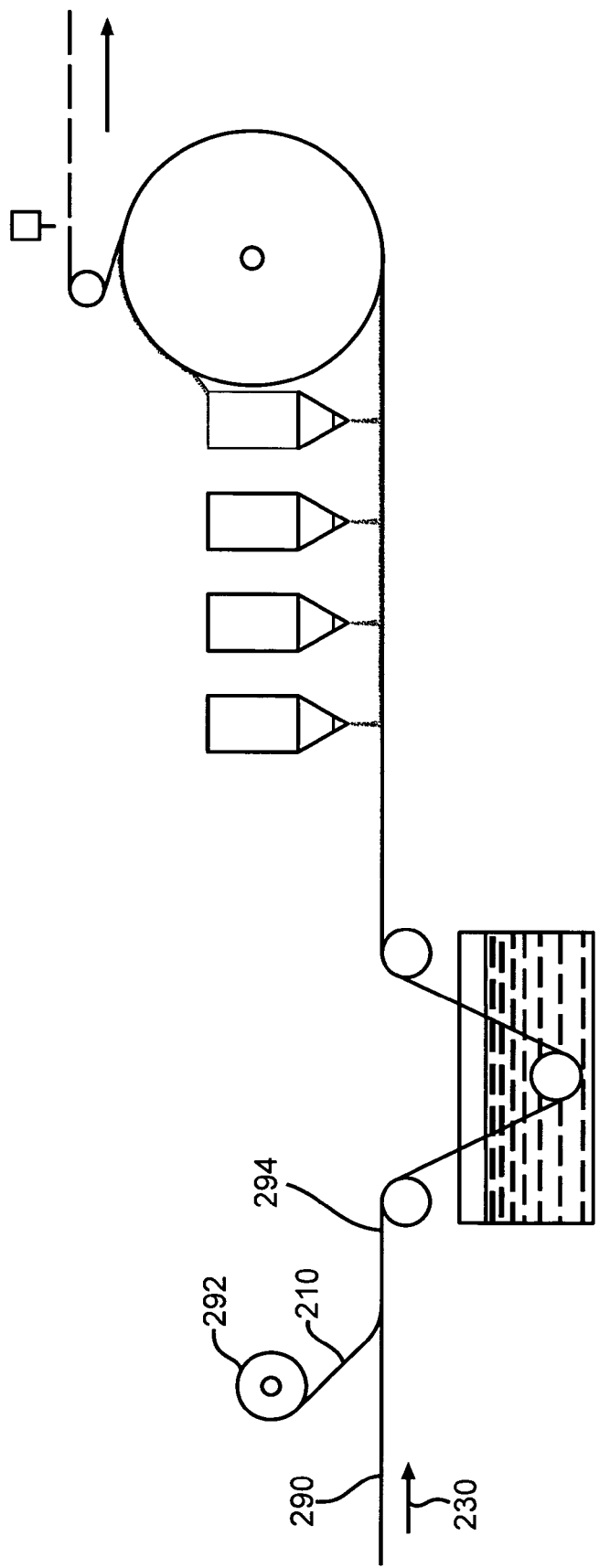
FIG. 10 is a side view, in elevation, of the apparatus for manufacturing the roofing shingle of FIG. 8.

The base layer 290 and the densified mat are bonded together using any suitable bonding manner. In one embodiment of an apparatus for manufacturing a multi-layered shingle as shown in FIG. 10, the base layer 290 is fed in a machine direction 230. The base layer is fed beneath a roll 292. The roll 292 is configured to apply the densified mat 210 to the base layer 290 in a cross-machine direction. The densified mat 210 is applied to the base layer 290 such as to bond to the base layer 290. Bonding the densified mat 210 to the base layer 290 produces a multi-layered mat 294. The multi-layered mat 294 is fed into the shingle manufacturing process, as described previously.

In alternative embodiments, secondary operations may be performed to add details, such as providing coatings or films in select areas. Alternatively, an overprinting process can be employed, wherein a granule coated sheet may be selectively coated with asphalt and additional granules adhered to the selectively coated portions. Furthermore, a sealant may be added to the top of the lower portion of the headlap area or the bottom of the tab area to seal adjacent shingles in a known manner. In such instances, it may be desirable to use a release tape as known to one skilled in the art. Additionally, one may use the invention taught in copending U.S. patent application Ser. No. 11/198,522, which is incorporated herein by reference in its entirety. Furthermore, the instant invention may be used to selectively insulate the roof, that is the thickness and density of the shingles may provide additional insulation value based the climate and construction utilized. Furthermore, the instant invention may be used with photovoltaic technology, and in such an instance, the lofted may provide a passage for airflow to cool the photovoltaic roofing elements, such as the elements described in U.S. Pat. Nos. 6,883,290 or 6,729,081, which are incorporated herein by reference in their entirety, and may provide room to route the wiring necessary for the photovoltaic roofing elements.

The principle and mode of operation of this invention have been described in its preferred embodiments. However, it should be noted that this invention may be practiced otherwise than as specifically illustrated and described without departing from its scope.

What is claimed is:

1. A roofing shingle comprising:
   a unitary mat having a densified surface layer;
   a layer of asphalt-based material coating the unitary mat; and
   a layer of granules deposited on the asphalt-coated mat;
   wherein the densified surface layer has regions of varying density;
   wherein the variations in the density of the regions of the densified surface layer of the unitary mat give the shingle differences in thickness thereby giving the shingle an appearance of depth.

2. The shingle of claim 1 in which the unitary mat is made of a fibrous material.

3. The shingle of claim 2 in which the fibrous material includes glass fibers.

4. The shingle of claim 1 in which the mat is made of a foam material.

5. The shingle of claim 1 having a prime region, the prime region having a plurality of tab regions and a plurality of cutout regions.

6. The shingle of claim 5 in which the plurality of cutout regions have a thickness and the plurality of tab regions have a thickness, the thickness of the plurality of tab regions being greater than the thickness of the plurality of cutout regions, wherein the thickness differences between the cutout regions of the shingle and the tab regions of the shingle correspond to the thickness variations of the unitary mat.

7. The shingle of claim 1 having a headlap region, the headlap region having a substantially uniform thickness.

8. The shingle of claim 6 wherein the ratio of the thickness of the plurality of tab regions of the unitary mat to the thickness of the plurality of cutout regions of the unitary mat is in a range from about 1.0 to about 3.0.

9. The shingle of claim 6 in which the ratio of the thickness of the plurality of tab regions of the shingle to the thickness of the plurality of cutout regions of the shingle is in a range from about 1.5 to about 8.0.

10. The shingle of claim 8 in which the tab regions of the unitary mat have a lower density than the cutout regions of the unitary mat.

11. The shingle of claim 1 in which the mat is comprised of multiple layers, with at least one of the layers being narrower in a cross-machine direction than at least one other of the layers, thereby giving the mat regions of various thickness.

12. A method of manufacturing roofing shingles comprising the steps of:
    providing a mat;
    selectively modifying regions of the mat to make those regions more dense, thereby producing a densified mat, the densified mat having regions of various thicknesses, with the more dense regions being of lesser thickness than other regions;
    coating the densified mat with roofing asphalt to make an asphalt-coated sheet;
    depositing granules onto the asphalt-coated sheet to form a granule-covered sheet; and
    cutting the granule-covered sheet into shingles;
    wherein the variations in the thickness of the regions of the mat give the shingle differences in thickness corresponding to the thickness variations in the regions of the mat, thereby giving the shingle an appearance of depth.

13. The method of claim 12 in which the mat is made of a fibrous material.

14. The method of claim 13 in which the fibrous material includes glass fibers.

15. The method of claim 12 in which the mat is made of a foam material.

16. The method of claim 12 in which the shingle has a prime region, the prime region having a plurality of tab regions and a plurality of cutout regions.

17. The method of claim 16 in which the plurality of cutout regions have a thickness and the plurality of tab regions have a thickness, the thickness of the plurality of tab regions being greater than the thickness of the plurality of cutout regions.

18. The shingle of claim 12 having a headlap region, the headlap region having a substantially uniform thickness.

19. The shingle of claim 17 wherein the ratio of the thickness of the plurality of tab regions of the mat to the thickness of the plurality of cutout regions of the mat is in a range from about 1.0 to about 3.0.

20. The shingle of claim 17 wherein the ratio of the thickness of the plurality of tab regions of the shingle to the thickness of the plurality of cutout regions of the shingle is in a range from about 1.5 to about 8.0.

21. The method of claim 12 in which regions of the mat are selectively modified by applying heat and compression.

22. The method of claim 16 in which the tab regions of the mat have a low density and the cutout regions of the mat have a high density.

23. The method of claim 22 in which the tab regions of the mat have an increase in density of no more than about 0% to about 40% from the density of the original mat prior to the selective modification.

24. The method of claim 16 in which the cutout regions have an increase in density in a range from about 1 times to about 15 times the density of the original mat.

25. A method of manufacturing roofing shingles comprising the steps of:
    providing a mat;
    providing a base layer;
    applying the mat to the top of the base layer to form a multi-layered mat, the base layer being wider in the cross-machine direction than the mat so that the multi-layered mat has regions of various thickness;
    coating the multi-layered mat with roofing asphalt to make an asphalt-coated sheet;
    depositing granules onto the asphalt-coated sheet to form a granule-covered sheet; and
    cutting the granule-covered sheet into shingles;
    wherein the variations in the thickness of the regions of the multi-layered mat give the shingle differences in thickness corresponding to the thickness variations in the regions of the multi-layered mat, thereby giving the shingle an appearance of depth.

26. The method of claim 25 in which regions of the mat are selectively modified to make those regions more dense thereby producing a densified mat, the densified mat having regions of various thicknesses, with the more dense regions being of lesser thickness than other regions of the mat.

27. The method of claim 25 in which the base layer is made of a fibrous material.

28. The method of claim 26 in which the multi-layered mat includes a second base layer.

29. The method of claim 28 in which the second base layer is disposed between the base layer and the densified mat.

30. A roofing shingle comprising: a unitary mat having a densified surface layer, the densified surface layer having tab regions and cutout regions of various thickness and density; and
    a coating layer applied to the unitary mat;
    wherein the tab regions of the unitary mat have a lower density than the cutout regions of the unitary mat.

31. The shingle of claim 30 in which the unitary mat is made of a fibrous material.

32. The shingle of claim 30 in which the plurality of cutout regions have a thickness and the plurality of tab regions have a thickness, the thickness of the plurality of tab regions being greater than the thickness of the plurality of cutout regions, wherein the thickness differences between the cutout regions of the shingle and the tab regions of the shingle correspond to the thickness variations of the unitary mat.

* * * * *